United States Patent
Bergh et al.

(10) Patent No.: US 7,331,452 B2
(45) Date of Patent: Feb. 19, 2008

(54) SLEEVE FOR HOLDING DIGITAL VIDEO DISCS AND GRAPHICS

(75) Inventors: James Allen Bergh, Boulder, CO (US); Terrence Martin Drew, Superior, CO (US)

(73) Assignee: Thule Organization Solutions, Inc., Longmont, CO (US)

( * ) Notice: Subject to any disclaimer, the term of this patent is extended or adjusted under 35 U.S.C. 154(b) by 485 days.

(21) Appl. No.: 10/765,446

(22) Filed: Jan. 26, 2004

(65) Prior Publication Data

US 2004/0168938 A1 Sep. 2, 2004

Related U.S. Application Data

(63) Continuation of application No. 29/180,116, filed on Apr. 17, 2003, now Pat. No. Des. 493,658, and a continuation-in-part of application No. 29/180,115, filed on Apr. 17, 2003, now Pat. No. Des. 495,183, and a continuation-in-part of application No. 10/238,454, filed on Sep. 9, 2002, now Pat. No. 6,681,929.

(51) Int. Cl.
*B65D 85/30* (2006.01)

(52) U.S. Cl. .................... 206/308.1; 206/312; D6/626; D19/33

(58) Field of Classification Search ............. 206/308.1, 206/312, 313; D6/626, 407; D19/33
See application file for complete search history.

(56) References Cited

U.S. PATENT DOCUMENTS

| | | |
|---|---|---|
| 1,098,154 A | 5/1914 | Housh |
| 4,263,357 A | 4/1981 | Holson |
| D261,155 S | 10/1981 | Nast |
| 4,620,630 A | 11/1986 | Moss |
| 4,850,731 A | 7/1989 | Youngs |
| 5,301,445 A | 4/1994 | Hoffmeister |
| D353,837 S | 12/1994 | Miller |
| 5,396,987 A | 3/1995 | Temple et al. |
| 5,501,326 A | 3/1996 | Shuhsiang |
| 5,501,540 A | 3/1996 | Ho |
| 5,531,320 A | 7/1996 | Uchida |
| 5,555,977 A | 9/1996 | Oshry et al. |
| 5,556,683 A | 9/1996 | Ranalli |
| 5,588,527 A | 12/1996 | Youngs |
| 5,588,528 A | 12/1996 | Ozeki |
| 5,595,797 A | 1/1997 | Miller |
| 5,620,271 A | 4/1997 | Bergh et al. |
| 5,692,607 A | 12/1997 | Brosmith et al. |
| 5,715,937 A | 2/1998 | Oshry et al. |
| 5,720,384 A | 2/1998 | Wu-Chen |
| D391,989 S | 3/1998 | Plutsky |
| 5,806,677 A | 9/1998 | Storti |
| 5,816,305 A | 10/1998 | May |
| 5,882,748 A | 3/1999 | Tomoda |

(Continued)

FOREIGN PATENT DOCUMENTS

JP 1996026367 A 1/1996

(Continued)

*Primary Examiner*—Jila M. Mohandesi
(74) *Attorney, Agent, or Firm*—Sheridan Ross P.C.

(57) ABSTRACT

This invention relates to a sleeve for holding two or more digital video discs in a vertically aligned or stacked relationship on a first side of a carrying sleeve and the accompanying graphics on an opposing side.

5 Claims, 5 Drawing Sheets

U.S. PATENT DOCUMENTS

| | | |
|---|---|---|
| D411,402 S | 6/1999 | Udwin |
| 5,975,291 A | 11/1999 | Attar et al. |
| 5,988,374 A | 11/1999 | Funawatari et al. |
| D421,869 S | 3/2000 | Drew et al. |
| D426,099 S * | 6/2000 | Udwin et al. ............... D6/626 |
| D428,297 S | 7/2000 | Drew et al. |
| D431,408 S | 10/2000 | Drew et al. |
| D432,343 S | 10/2000 | Drew et al. |
| 6,186,320 B1 | 2/2001 | Drew |
| 6,210,798 B1 | 4/2001 | Sandor et al. |
| D441,591 S | 5/2001 | Drew |
| 6,241,086 B1 | 6/2001 | Bergh et al. |
| 6,267,234 B1 | 7/2001 | Bergh et al. |
| 6,325,207 B2 | 12/2001 | Drew |
| D453,428 S | 2/2002 | Beer |
| 6,446,800 B2 | 9/2002 | Bergh et al. |
| 6,681,929 B2 | 1/2004 | Bergh et al. |
| 6,698,587 B2 | 3/2004 | Bergh et al. |
| D493,658 S | 8/2004 | Hassett |
| D495,183 S | 8/2004 | Hassett |
| 6,796,426 B2 | 9/2004 | Fu et al. |
| 6,926,140 B2 | 8/2005 | Bergh et al. |

FOREIGN PATENT DOCUMENTS

| | | |
|---|---|---|
| JP | 1997077170 A | 3/1997 |

* cited by examiner

SLEEVE FOR HOLDING DIGITAL VIDEO DISCS AND GRAPHICS

This application is a continuation and claims priority of U.S. patent application Ser. No. 29/180,116, which was filed on Apr. 17, 2003 now U.S. Pat. No. D,493,658 and U.S. patent application Ser. No. 29/180,115, which was filed on Apr. 17, 2003 now U.S. Pat. No. D,495,183, and is a continuation-in-part and claims priority of pending U.S. patent application Ser. No. 10/238,454 which was filed on Sep. 9, 2002 now U.S. Pat. No. 6,681,929, which claimed priority of U.S. Pat. No. 6,446,800 having a filing date of Jun. 1, 2001, which claimed priority of U.S. Pat. No. 6,241,086 having a filing date of May 12, 1999, which claimed priority of U.S. Provisional Patent Application Ser. No. 60/091,977, having a filing date of Jul. 7, 1998, each application being incorporated herein in their entirety by reference.

FIELD OF THE INVENTION

This invention relates to sleeves for holding recording discs, and more specifically digital video discs and their accompanying graphics.

BACKGROUND OF THE INVENTION

Compact discs, or "CD"'s as they are commonly called, carry digital information such as sound and music recordings and more recently movies and video games with accompanying sound known as Digital Video Discs (hereinafter collectively "DVDs"). The DVDs replace popular video cassettes which are typically played on video cassette recorders (VCRs), and more commonly may be played on personal computers.

DVDs are generally sold to consumers in "jewel boxes" which are rigid plastic containers which carry both the DVD and accompanying graphics which identify the particular movie, video game or program contained on the DVD. The jewel boxes are bulky, difficult to store and are not conveniently opened or closed to remove the DVD. Furthermore, the graphics sold in association with the DVDs are oversized and generally resemble the size and shape of video cassettes as apposed to the width and length of the DVD. That is, the graphics are generally much longer than the DVD and additionally slightly wider. Thus, storing the DVD in a form of flexible, lightweight storage sleeve and the corresponding graphics in a sleeve with equal sized pockets is problematic.

Although lightweight, flexible storage sleeves which are designed specifically for CD's are known in the art, these devices are not designed to hold the larger graphics sold in association with DVDS. Further, if a sleeve is manufactured which is compatible in length and width for the DVD graphics, the DVD pocket which is designed for holding the DVD will generally be oversized and not overly useful.

Recent innovations have allowed DVD's and their associated longer graphics pages to be stored in a sleeve with two sizes of pockets, as disclosed in the Applicant's U.S. Pat. Nos. 6,241,086, 6,446,800 and 6,267,234 which are incorporated herein by reference in their entirety. However, these inventions do not allow for the multiple storage of DVD's in a "stacking" types of orientation, which provides greater storage capacity.

Thus, a lightweight, flexible storage sleeve for storing DVDs is needed which can additionally store the oversized graphics associated with the DVD in a similarly sized pocket, and additionally to allow the "stacking" of multiple DVD's on a storage sleeve. Further, the manufacturing of the DVD sleeve must be consistent with generally recognized sleeve manufacturing processes to maintain the low cost benefits associated with flexible storage sleeves as opposed to rigid plastic jewel boxes.

SUMMARY OF THE INVENTION

It is thus an object of the present invention to provide a lightweight, flexible sleeve to store DVDs and the accompanying oversized graphics in pockets with substantially similar widths. Thus, in one embodiment of the present invention a sleeve is provided which is comprised of a front layer, an intermediate middle layer and a back layer. A pocket is provided between the front layer and middle layer for receiving a DVD while a second pocket is provided between the middle layer and back layer to receive the graphics.

It is a further aspect of the present invention to provide a cost effective, non-woven material which is in contact with the DVD which prevents scratching, does not accumulate grit or other particles and which is firm enough not to require a backing sheet for support. In one aspect of the present invention a non-woven material known as "Veratec®" is provided to serve this purpose.

It is another aspect of the present invention to provide a DVD and accompanying graphics storage sleeve which has a storage pocket for the DVD and which has a "DVD stop seal" which allows the DVD to be stored at an elevated height, thus permitting the top edge of the DVD to be near the access opening of the DVD storage pocket for easy access. The stop seal prevents the DVD from falling into the DVD storage pocket and inhibiting removal.

In one embodiment of the present invention, the stop seal is provided by utilizing a back sheet with a back sheet aperture in conjunction with a conventional manufacturing process to minimize expenses during manufacturing. Alternatively, the sleeve with a stop seal may be manufactured without utilizing a back sheet aperture.

In another aspect of the present invention, the same technology which provides the DVD stop seal in the DVD storage pocket is utilized to provide one or more "frictional nubs" to be provided in the DVD storage pocket. The "frictional nubs" prevent the DVD from falling out of the DVD storage pocket when the sleeve is turned upside down. For example, in one embodiment of the present invention the DVD storage pocket may utilize a top layer which is approximately the length of the DVD and which has a "thumb cut" or notch to allow access to the aperture of the DVD with a user's fingers or thumb. in this embodiment, there is no flap which overlays the DVD. Since the storage pocket has a diameter which is slightly larger than the DVD (as a result of the oversized graphics pocket), the DVD falls from the pocket when the sleeve is turned upside down.

To alleviate this problem, the frictional nubs engage the side edges of the DVD and prevent the DVD from inadvertently falling out of the DVD pocket. In one embodiment of the present invention the frictional nubs are provided by the sealing of the front sheet and middle sheet at one or more predetermined locations to create a DVD pocket diameter which is slightly larger than the diameter of the DVD yet provides sufficient frictional resistance to prevent the DVD from inadvertently falling out. The frictional nubs may be provided during an ultrasonic or RF welding process by providing one or more apertures in the back sheet which allow the ultrasonic welding to occur at a predetermined location without welding any other portion of the front, middle or back sheet. Alternatively, the frictional nubs may be provided without utilizing back sheet apertures by utilizing a two stage manufacturing technique which first welds the front sheet and middle sheet together while creating the frictional nubs. The back sheet is then welded in a second stage to the front and middle sheets to complete the DVD sleeve.

It is another aspect of the present invention to provide a manufacturing process for producing a sleeve design for DVDs and accompanying graphics which utilizes a "cutout" portion in the back sheet to provide either the DVD stop seal or frictional nubs on the front sheet as discussed above. Thus, in one aspect of the present invention a "cutout" or aperture in the back sheet is utilized in combination with a sheet bonding process to interconnect the front sheet and middle sheet at preselected positions to either provide a DVD stop seal in one sleeve design or one or more frictional nubs in another embodiment of the invention. Alternatively, a manufacturing process is provided which does not utilize or require a back sheet aperture to create either the DVD stop seal on the functional nubs.

In another aspect of the present invention, a "write-on" title strip is provided either along the upper edge or lateral edge of the DVD sleeve which is made of a material which permits the recordation of information related to the stored DVD either in pen, ink, or pencil.

It is another aspect of the present invention to provide a storage sleeve which creates two or more distinct pockets on the same side of a storage sleeve to facilitate the "stacking" of two or more DVD's in an overlapping relationship, yet which allows finger access to at least a portion of a perimeter edge of each DVD to facilitate removal.

DETAILED DESCRIPTION OF THE PREFERRED EMBODIMENT

Referring now to the drawings, FIGS. 1-6 are depictions of one embodiment of the present invention. More specifically, the drawing shows a DVD storage sleeve 2 capable of holding two DVD discs 4 on a front side of the sleeve 2, and the associated graphics 26 stored in a graphics pocket 24 on the opposite side of the sleeve 2.

The DVD sleeve 2 is generally comprised of a front or top sheet 6, a middle sheet 18 and a back sheet 20. In the embodiment shown in FIGS. 1-6, two or more DVD pockets 22 or sleeves capable of holding a DVD is formed between the front sheet 6 and middle sheet 18, while a second graphics pocket 24 or sleeve is formed between the middle sheet 18 and back sheet 20 for holding the graphics 22 associated with the two DVDs. FIG. 2 depicts a top plan view of the embodiment shown in FIG. 1, while FIG. 3 represents a right elevation view and FIG. 4 depicts a rear elevation view which reveals the second graphics pocket 24 which is adapted to receive and store a graphics page 22 (not shown).

In one aspect of the present invention, both the front sheet 6 and middle sheet 18 are comprised of a spun-bonded, non-woven material to prevent scratching of the DVD. In another embodiment, a non-woven material such as Veratece is provided. Alternatively, woven materials or other non-woven materials such as Sontara® can be used with or without any type of reinforced backing sheet made of polypropylene or other similar materials. The back sheet 20 is preferably a transparent polypropylene or other similar material which enables the user to clearly see the graphics positioned in the graphics storage pocket 24. Alternatively, any other type of transparent material may be used as appreciated by one skilled in the art. Various embodiments of the present invention sleeve design which have a configuration for storing multiple DVDs on each side of the sleeve, and without the accompanying graphics would preferably use non-woven materials for the front sheet 6, middle sheet 18 and back sheet 20.

Since the DVD graphics 26 are generally wider and substantially longer than the diameter of the DVD 4 which is stored in the opposing DVD storage pocket, modifications must be made to the DVD storage pocket to facilitate access to the DVD 4 and/or prevent the DVD from falling out of the storage sleeve if the sleeve is inverted. In the embodiments shown in FIGS. 1-14, a flap 14 or lip is provided in the front sheet 6 to cover at least a portion of the DVD, and to prevent dust and other foreign materials from entering the pocket. Further, the flap 14 prevents the DVD from falling out if the sleeve is inadvertently inverted. In one embodiment shown in FIG. 7, the flap 14 has an arcuate shape at the point of termination to resist tearing when the flap is repeatedly opened and closed.

Figure 5:
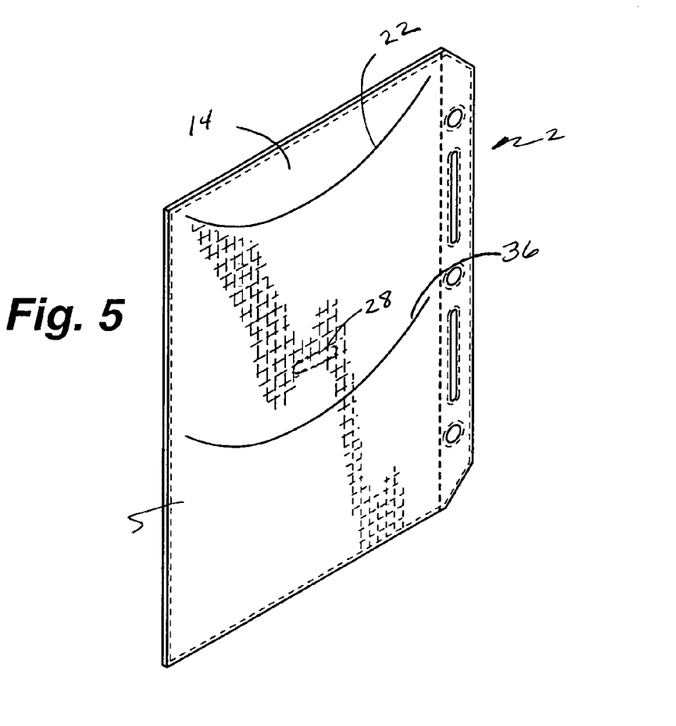
FIG. 5 is a front perspective view of the DVD storage sleeve shown in FIG. 1, and showing a first and second opening for receiving a first DVD and second DVD.
Figure 6:
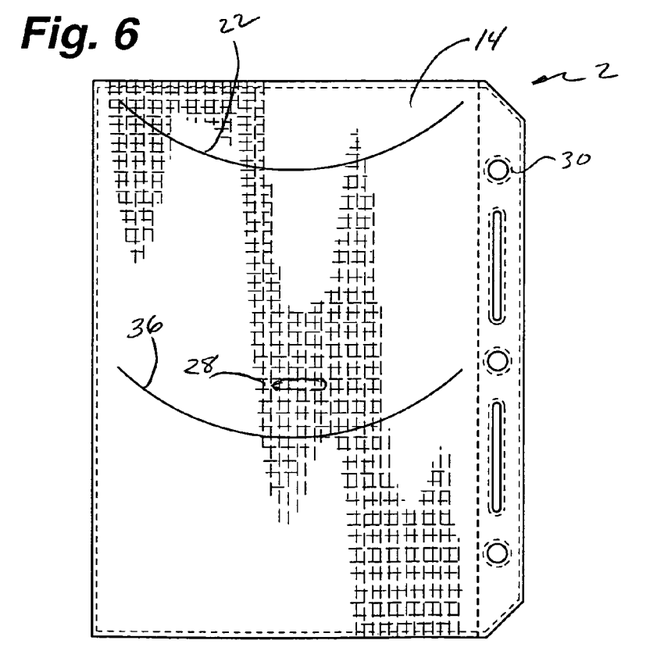
FIG. 6 is a front elevation view of the DVD storage sleeve shown in FIG. 1.

Since a DVD 4 has a diameter which is generally less than the length of a DVD graphics sheet 26 associated with the DVD 4, the overall DVD pocket 22 length must be substantially reduced to prevent the DVD 4 from falling into the pocket an excessive distance. Thus, a DVD "stop seal" 28 is provided and positioned at a distance which is approximately the diameter of a DVD from the sleeve upper edge 8 to hold the DVD 4 at an elevation which allows removal of the DVD 4 when the flap 14 is lifted upward. Preferably the DVD stop seal 28 is positioned at a location which places a top edge of the DVD proximate to the sleeve upper edge 8. As seen in FIGS. 5 and 6, a first DVD pocket 22 is provided near an upper portion of the sleeve 2, while a second DVD pocket 36 is provided in a lower portion of the DVD sleeve 2. To support a DVD in an elevated position in the first DVD pocket 22, a DVD stop seal 28 is provided which interconnects the front sheet 6 and middle sheet 18 at a predetermined location.

The DVD stop seal 28 is created by interconnecting the flexible front sheet 6 to the middle sheet 18 at a predetermined location, yet not interconnecting the middle sheet 18 to the flexible back sheet 20 and hence reducing the size of the graphics pocket 24. The interconnection may be accomplished by individually sewing, heat bonding or otherwise interconnecting the front sheet 6 and middle sheet 18 prior to interconnecting the back layer. Preferably, the front sheet 6 is first interconnected to the middle sheet 18 by welding or other similar techniques commonly known in the art. The back sheet is then interconnected to the middle sheet 18 along the lateral edges 12 by welding, serving, stitching, head bonding or other similar means known in the art to complete the DVD sleeve in a two stage manufacturing process.

Figure 1:
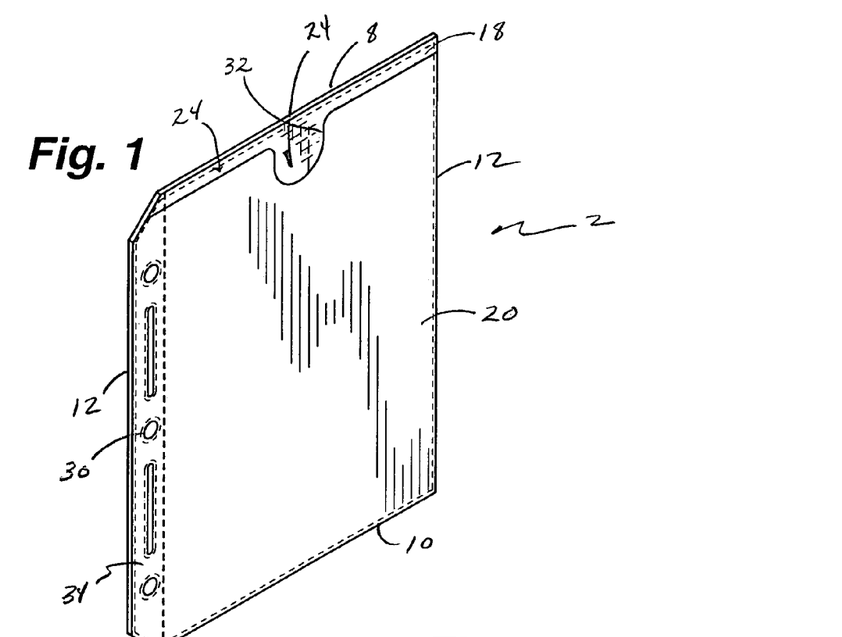
FIG. 1. is a rear perspective view of one embodiment of a multiple DVD storage sleeve.
Figures 2, 4:
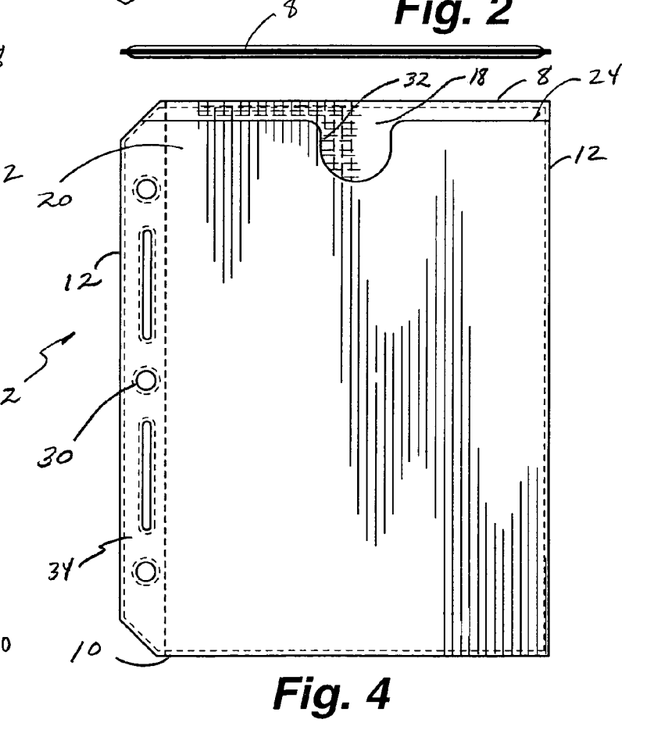
FIG. 2 is a top plan view of the DVD storage sleeve shown in FIG. 1.
FIG. 4 is a rear elevation view of the DVD storage sleeve shown in FIG. 1.
Figure 3:
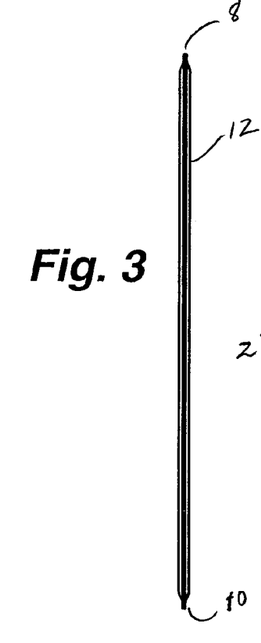
FIG. 3 is a right elevation view of the DVD storage sleeve of FIG. 1.

Although in the embodiment shown in FIG. 1 and FIG. 2 the DVD stop seal 28 is substantially oval in shape, as appreciated by one skilled in the art the geometric shape and size of the DVD stop seal 28 can be any variety of sizes and shape. For example, it is possible to use straight lines, circles, arcuate lines, triangular or rectangular shapes as long as the DVD stop seal 28 serves the purpose of interconnecting the front sheet 6 and middle sheet 18 at a position which elevates the DVD in the first DVD pocket 22 above the second DVD pocket 24. In the embodiment shown in FIGS. 1-6, the second DVD rests on a lower portion of the DVD pocket, while the first DVD is elevated above the second DVD. As appreciated by one skilled in the art, the actual positioning of the stop seal and each DVD is not critical to the invention, but rather the concept that two or more DVD's can be "stacked", juxtapositioned, or otherwise stored on one side of the DVD sleeve 2.

Figure 7:
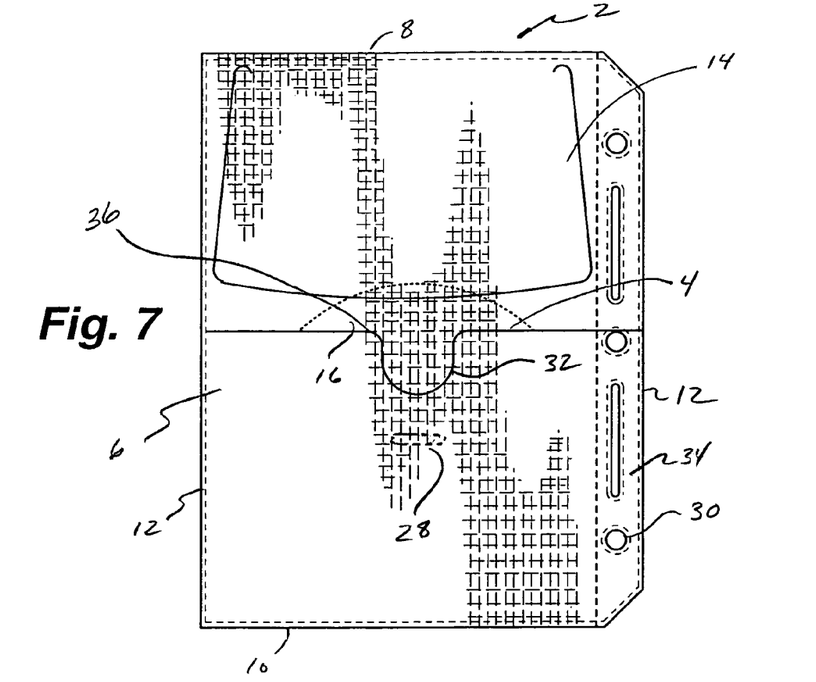
FIG. 7 is a front elevation view of an alternative embodiment of the invention shown in FIG. 1, with a larger flap positioned proximate to the upper edge of a first DVD storage pocket.
Figure 8:
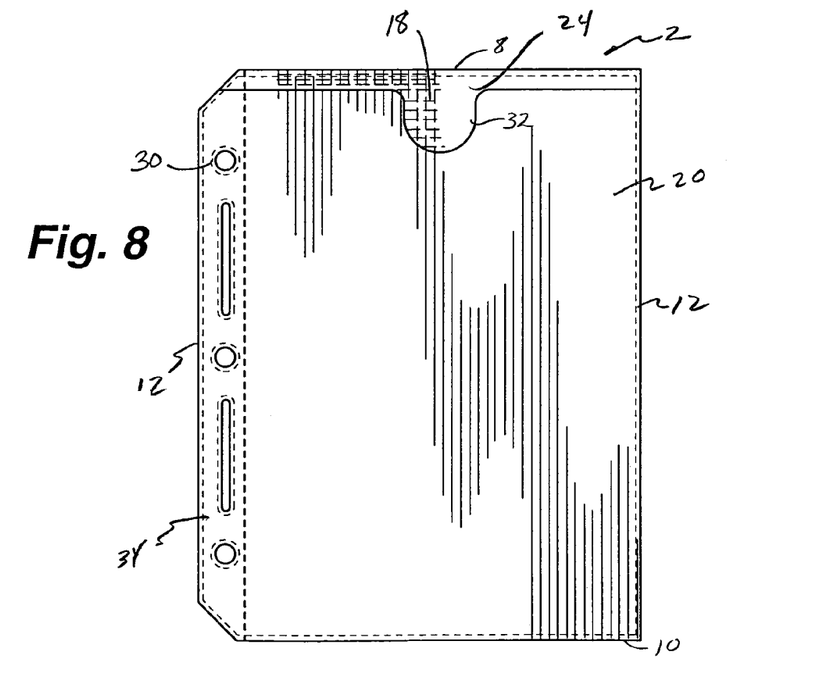
FIG. 8 is a rear elevation view of the sleeve shown in FIG. 7.

Referring now to FIGS. 7-8, an alternative embodiment is provided herein which utilizes a different shaped flap 14 which is positioned over the first DVD pocket 22, while the second DVD pocket 36 has a thumb notch 32 to facilitate removal of a second DVD 16. More specifically, the flap 14 is designed to extend substantially over the entire diameter of the DVD 4, and on an upper portion has a termination point which is substantially arcuate in shape to prevent tearing after repeated opening and closing. As further seen in FIG. 7, a DVD 4 is shown positioned in a second DVD pocket 36, and which additionally includes a thumb notch 32 to facilitate removal of the DVD. Additionally seen in both FIGS. 7 and 8 is a binding strip 34 positioned along at least one of two lateral edges 12 of the DVD sleeve 2 and which alternatively may be positioned along an upper edge 8 or a bottom edge 10. The binding strip 34 is designed to facilitate the insertion of the sleeve 2 into a wallet or notebook, and which may include one or more binding apertures 30 for use with a three-ring binder, for example. Alternatively, other geometric shapes such as the oval cut outs shown in FIGS. 7 and 8 may be used in conjunction with strap type binding mechanisms found in some wallets and notebooks. As shown in FIG. 8, it is additionally preferable that the back sheet 20 be comprised of a transparent material such as a polypropylene, polyethylene or other plastic type material which allows viewing of the graphics sheet and to provide a reference to a user regarding the contents of the DVDs 4 positioned on the opposing sides. Alternatively, opaque type materials could also be used.

Figure 9:
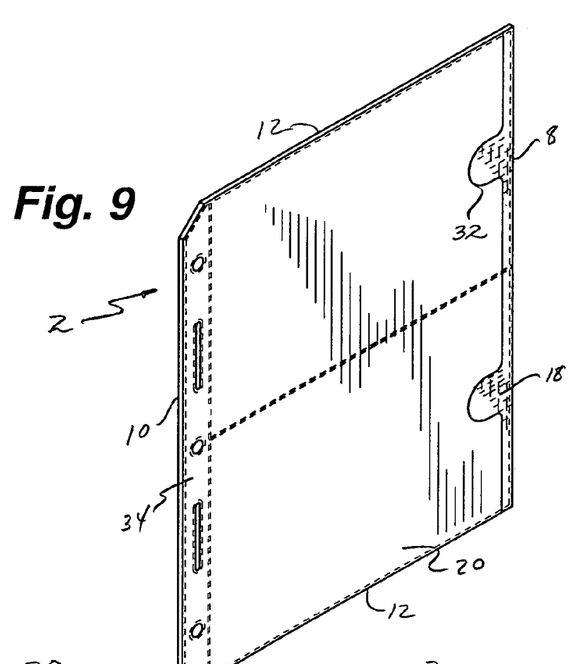
FIG. 9 is a rear perspective view of an alternative DVD storage sleeve adapted to hold two graphics pages and four DVD's.
Figures 10, 11, 12:
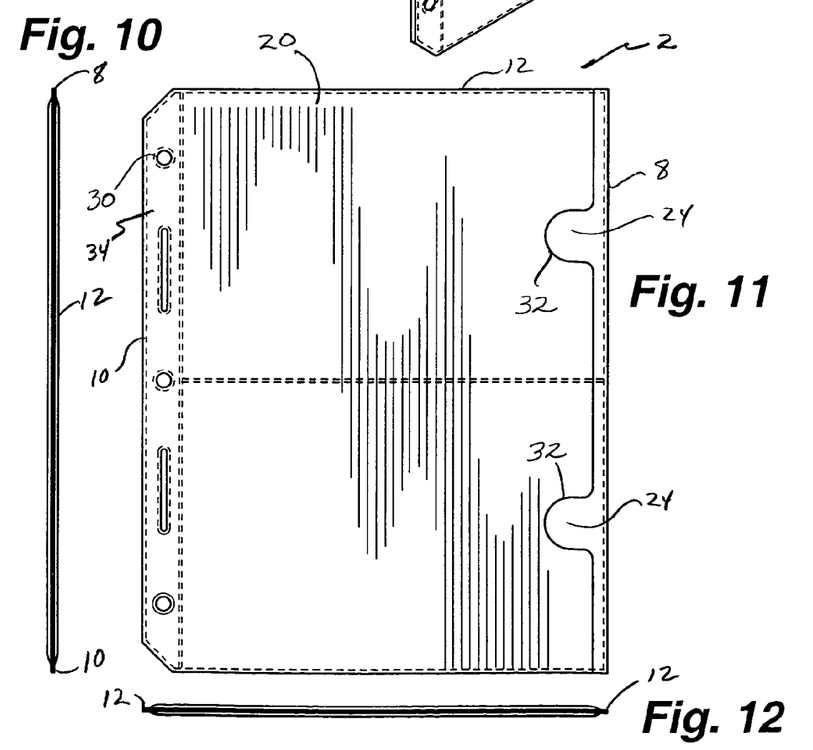
FIG. 10 is a left elevation view of the sleeve shown in FIG. 9.
FIG. 11 is a rear elevation view of the DVD storage sleeve shown in FIG. 9.
FIG. 12 is a top plan view of the DVD storage sleeve shown in FIG. 9.
Figure 13:
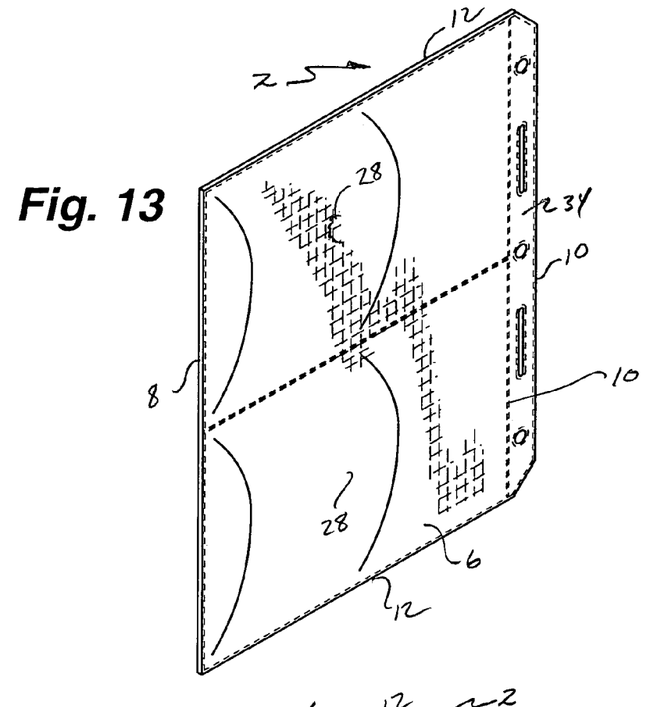
FIG. 13 is a front perspective view of the DVD storage sleeve shown in FIG. 9.
Figure 14:
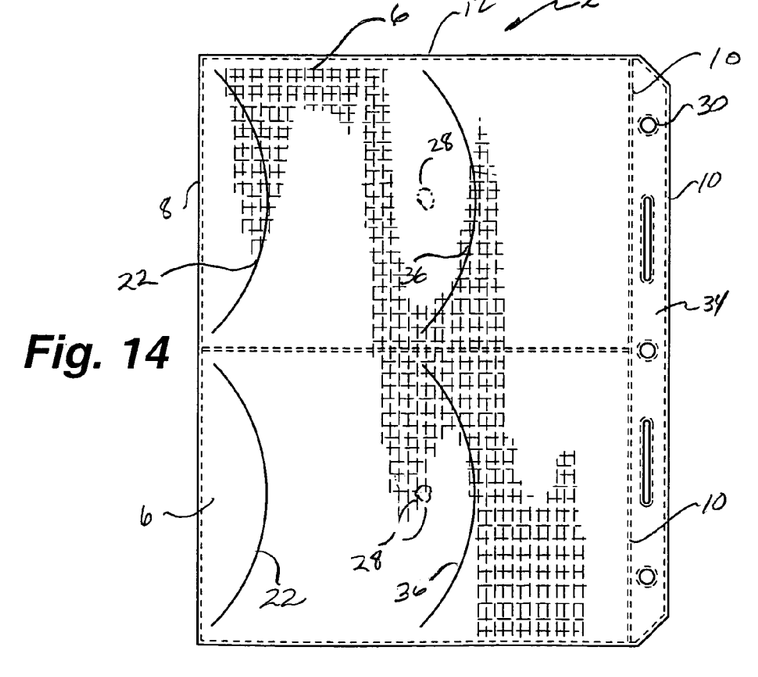
FIG. 14 is a front elevation view of the DVD storage sleeve shown in FIG. 9, and identifying a plurality of openings for receiving, wherein the sleeve can store 4 DVD's on one side.

Referring now to FIGS. 9-14, an alternative embodiment of the present invention is provided herein, and which is generally designed to hold two graphic sheets on one side of the sleeve 2, and four DVDs 4 on an opposing side. More specifically, FIG. 9 is a rear perspective view of one embodiment of the present invention, while FIG. 10 is a left elevation view, and FIG. 11 is a rear elevation view of the embodiments shown in FIG. 9. FIG. 12 is a top plan view of the invention shown in FIG. 9, while FIG. 13 is a front perspective view and FIG. 14 is a front elevation view of the sleeve 2 identified in FIG. 9.

The embodiments shown in FIGS. 9-14 are designed to hold two graphic sheets and four DVDs 4 in one sleeve 2 which is adapted for use in a wallet or notebook. Accordingly, in FIGS. 9 and 11, two specific graphic pockets are identified which include a thumb cut 32 positioned proximate to a right lateral edge, and which is designed to facilitate insertion and removal of the graphics page. A binding strip 34 is additionally shown positioned on a left lateral edge of the sleeve 2, and which includes a plurality of apertures 30 which maybe used for insertion in a three-ring binder, or other type of wallet or notebook. Alternatively, a plurality of longitudinal apertures are provided herein for insertion into a DVD storage wallet or notebook which has a strap-type binding mechanism. As additionally shown in FIGS. 9 and 11, the back sheet 20 is preferably comprised of a transparent material such as a plastic or polyethylene to view the graphics sheet and to allow identification for a user.

Referring now to FIGS. 13 and 14, a front perspective and front elevation view of the sleeve 2 of the present invention is provided herein. As identified in these drawings, the front sheet 6 is preferably comprised of a non-woven material, which is non-scratching and suitable for interconnection with a middle sheet 18, which is made of a similar non-woven material, which is not likely to scratch the recording surface of the DVD. As previously discussed, different woven or non-woven materials may additionally be used for the same purpose. As seen in FIG. 13, at least one DVD stop seal 28 is provided at substantially a mid-point between an upper edge and a lower edge of the DVD sleeve 2. The DVD stop seal 28 is designed to interconnect the middle sheet 18 to the front sheet 6, and hence define a first DVD pocket 22 which supports one DVD, while the second DVD pocket 36 is defined by a bottom edge 10 of the DVD sleeve 2. Thus a first DVD may be inserted in the first DVD pocket 22, a second DVD may be inserted in a second DVD pocket 36, a third DVD may be inserted in a third DVD pocket, and a fourth DVD may be inserted in a fourth DVD pocket. Accordingly, four individual DVDs may be positioned on one side of the DVD sleeve 2 of the present invention, while two graphic sheets associated with the DVDs may be positioned in a fifth graphics pocket and a sixth graphics pocket on the opposite side of the DVD sleeve 2. The fifth and sixth pockets having a larger storage area than that at least one said first second, third and forth pockets. As appreciated by one skilled in the art, additional numbers of pockets may be designed and positioned in various combinations of sheets to facilitate additionally storage, and is dictated only by the size of the sleeve 2, and the number of pockets created to hold individual DVDs.

To assist the reader in the understanding of the present invention, the following list of components and associated numbering found in the drawings are provided hereinbelow:

| Number | Component |
| --- | --- |
| 2 | Sleeve |
| 4 | Digital video disc |
| 6 | Front sheet |
| 8 | Upper edge |
| 10 | Bottom edge |
| 12 | Lateral edge |
| 14 | Flap |
| 16 | Digital video disc front surface |
| 18 | Middle sheet |
| 20 | Back sheet |
| 22 | First DVD pocket |
| 24 | Graphics pocket |
| 26 | Graphics |
| 28 | DVD stop seal |
| 30 | Binding aperture |
| 32 | Thumb notch |
| 34 | Binding strip |
| 36 | Second DVD pocket |

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the claims be construed to include all alternative embodiments as permitted by the prior art.

What is claimed is:

1. A sleeve adapted for holding a plurality of electronic discs on a front side and at least one graphics page on a back side, comprising:
    a flexible front sheet having a top edge, a bottom edge, and lateral edges extending there between;
    a plurality of openings in said front sheet which are operably sized to receive the electronic discs, said plurality of opening including a second opening positioned above a first opening, a third opening positioned substantially adjacent to said first opening and a fourth opening positioned above said third opening and adjacent to said second opening;
    a flexible back sheet having a top edge, a bottom edge, and lateral edges positioned there between;
    a flexible middle sheet positioned between said flexible front sheet and said flexible back sheet, said flexible front sheet, said flexible back sheet and said flexible middle sheet interconnected along at least said bottom edge and said lateral edges to form a plurality of pockets positioned proximate to each of said first opening, second opening, third opening and fourth opening for holding the electronic discs, and a fifth and sixth pocket formed between said middle sheet and said flexible back sheet for holding a plurality of graphics, said fifth pocket and said sixth pocket having a larger storage area than that of at least one of said plurality of pockets;
    a first DVD stop seal interconnecting said front sheet to said middle sheet between said first opening and said second opening wherein the electronic disc in said second pocket is elevated above the electronic disc positioned in said first pocket; and
    a second DVD stop seal interconnecting said front sheet to said middle sheet between said third opening and said fourth sheet wherein the electronic disc in said fourth pocket is elevated above the electric disc positioned in said third pocket.

2. The sleeve of claim 1, wherein said flexible front sheet and said flexible back sheet are comprised of a non-woven material.

3. The sleeve of claim 1, wherein said flexible middle sheet is comprised of non-woven material.

4. The sleeve of claim 1, wherein said disc stopping seal has a geometric shape comprised of at least one of a circle, a square, an oval, a triangle, a straight line, and a rectangle.

5. The sleeve of claim 1, further comprising a binding strip interconnected to said bottom edge of said sleeve, said binding strip having a plurality of apertures adapted for interconnection to a binding device.

* * * * *